United States Patent
Mayer et al.

(10) Patent No.: US 6,402,810 B1
(45) Date of Patent: Jun. 11, 2002

(54) METHOD FOR DEHYDRATING AND/OR DEGASSING HYDRAULIC FLUIDS, DEVICE FOR CARRYING OUT SAID METHOD AND USE OF SAID DEVICE

(75) Inventors: Christian Mayer, Ditzingen; Walter Jehle, Horgenzell; Hubert Beitler, Kornwestheim, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/403,527

(22) PCT Filed: Apr. 18, 1998

(86) PCT No.: PCT/EP98/02304

§ 371 (c)(1),
(2), (4) Date: Jan. 18, 2000

(87) PCT Pub. No.: WO98/48175

PCT Pub. Date: Oct. 29, 1998

(30) Foreign Application Priority Data

Apr. 23, 1997 (DE) .......................... 197 17 043

(51) Int. Cl.⁷ .............................................. B01D 19/00
(52) U.S. Cl. ...................... 95/46; 96/6; 96/10; 210/640
(58) Field of Search ................... 95/46; 96/6, 10; 210/640

(56) References Cited

U.S. PATENT DOCUMENTS

| | | | |
|---|---|---|---|
| 3,778,971 A | * 12/1973 | Granger et al. | ........... 96/6 |
| 4,729,773 A | 3/1988 | Shirato et al. | ........... 55/158 |
| 4,869,732 A | * 9/1989 | Kalfoglou | ........... 95/46 |
| 5,296,144 A | * 3/1994 | Sternina et al. | ........ 210/640 X |
| 5,326,386 A | 7/1994 | Lee et al. | ........... 96/6 |
| 5,556,539 A | * 9/1996 | Mita et al. | ........ 210/640 X |
| 5,749,942 A | * 5/1998 | Mattis et al. | ........... 95/46 |
| 5,762,684 A | * 6/1998 | Hayashi et al. | ........ 95/46 X |

FOREIGN PATENT DOCUMENTS

| | | | |
|---|---|---|---|
| DE | 33 04 956 | * 8/1984 | ........... 95/46 |
| DE | 3935756 | 10/1989 | |
| DE | 4201565 | 1/1993 | |
| JP | 62203864 | 3/1986 | |
| JP | 62-042708 | * 2/1987 | ........... 96/6 |
| JP | 04171006 | 6/1990 | |
| JP | 02-290201 | * 11/1990 | ........... 95/46 |
| JP | 03-118802 | * 5/1991 | ........... 95/46 |
| JP | 03-154601 | * 7/1991 | ........... 95/46 |
| JP | 04-004002 | * 1/1992 | ........... 96/6 |
| JP | 04-011904 | * 1/1992 | ........... 96/6 |
| JP | 04-135604 | * 5/1992 | ........... 96/6 |
| JP | 04-156903 | * 5/1992 | ........... 96/6 |
| JP | 5253449 | 9/1992 | |
| JP | 07068134 | 3/1995 | |
| JP | 09262406 | 3/1996 | |
| JP | 09239205 | 7/1996 | |

OTHER PUBLICATIONS

Römpp Chemie Lexikon, p. 3305.

* cited by examiner

Primary Examiner—Robert H. Spitzer
(74) Attorney, Agent, or Firm—Crowell & Moring LLP

(57) ABSTRACT

A method for dewatering and/or degassing a hydraulic fluid includes separating gases and water in the hydraulic fluid from the hydraulic fluid by pervaporation at a membrane that is permeable to the gas and the water and that is impermeable to hydraulic fluid, while maintaining a partial pressure drop for the gas and the water near the membrane.

11 Claims, 3 Drawing Sheets

METHOD FOR DEHYDRATING AND/OR DEGASSING HYDRAULIC FLUIDS, DEVICE FOR CARRYING OUT SAID METHOD AND USE OF SAID DEVICE

BACKGROUND AND SUMMARY OF THE INVENTION

The invention relates to a method for dewatering and/or degassing hydraulic fluids, a device for working the method, and use of the device.

Hydraulic fluids are used in hydraulic systems for both hydrostatic and hydrodynamic drives, found in particular in control, regulating, drive, and braking systems of vehicles, aircraft, and other devices. The following distinction is made between hydraulic fluids:

a) mineral-oil-based hydraulic fluids
b) glycols, glycol ethers, and glycerins
c) silicone oils and esters, and
d) slow-burning fluids.

The penetration of air into a hydraulic system results in functional problems and material wear by cavitation, especially in a hydrodynamic drive.

Some hydraulic fluids are hygroscopic, absorbing water, and when hydraulic fluid is heated considerably, as frequently occurs in hydraulic systems, it produces vapor. The latter in turn causes functional problems and material wear inside the hydraulic system.

To prevent these problems, the hydraulic fluid is either replaced from time to time, or degassed or dewatered periodically, or a device is used for continuous degassing or dewatering.

A degassing device of this kind is known for example from EP-B-0 168 656, with the line being divided into a passageway for fluid with a throttle valve and a passageway for separated gas with a degassing valve. However, this device has many moving parts and allows only a quasi-continuous removal of air, but no dewatering. The device described in D-B-29 37 957 for degassing hydraulic fluids is based on the principle of producing a vacuum in a reservoir and drawing off the gases contained in the hydraulic fluid, but this takes up space and is cost-intensive.

EP-A-0 155 115 describes a device which permits continuous removal of air from water without moving parts. This device has a porous PTFE membrane which however permits use only at low pressures with a maximum of 2.5 bars and thus is suited primarily for water and other fluids with similarly high surface tension. The device is therefore not suitable for degassing hydraulic fluids. The same applies to DE-E-A-37 08 950 which is likewise based on this principle, and to JP-A-4-156903 which relates to the use of a semipermeable membrane for degassing water.

GB-B-1341052 relates to a method and a device for recovering gaseous hydrocarbons when they escape from fuel tanks, using the permeability of a plastic tube to such hydrocarbons. In U.S. Pat. No. 4,897,091 as well, gaseous carbon dioxide is separated from methanol containing carbon dioxide by a membrane that is the reaction product of a polyamine with a polyisocyanate or polycarbonyl chloride.

DE-E-A-32 15 003 describes a dialysis device in which air is removed from an air-water mixture by a pressure differential between two chambers separated by a hydrophobic membrane.

A device for pressure equalization in closed chambers is known from DE-A-26 05 694, with a gas-permeable and liquid-impermeable seal consisting of very fine cotton cloth or similar material being impregnated with the polymer of a fluorinated or chlorinated hydrocarbon.

The goal of the invention therefore is to provide a method and a device for degassing and/or dewatering hydraulic fluids which permits permanent degassing and/or dewatering in a reliable fashion while occupying limited space and having a low cost.

This goal is achieved according to the invention by virtue of the fact that gases dissolved in hydraulic fluid and/or water contained in said fluid are separated from the hydraulic fluid by the principle of pervaporation at a membrane which is permeable to gas and/or water but is impermeable to hydraulic fluid, with a partial pressure drop being maintained in the vicinity for gases and/or water.

An improvement on the invention consists in the fact that a pressure is developed or an existing pressure is utilized to maintain a partial pressure differential within the hydraulic system.

According to the invention, provision is made to develop a vacuum outside the hydraulic system to maintain the partial pressure differential.

It is also advantageous that a pressure is developed inside the hydraulic system to maintain the partial pressure differential and a vacuum is produced outside the hydraulic system for the same purpose.

Provision is made according to the invention such that the temperature of the hydraulic fluid is elevated or an elevated temperature of the hydraulic fluid is utilized for dewatering the hydraulic fluid.

The framework of the invention also includes a device for working the method according to the invention characterized in that a membrane is provided inside the hydraulic system that is permeable to gas and/or water and is impermeable to hydraulic fluid.

It is advantageous that means are provided for producing a vacuum on the outside of the membrane facing away from the hydraulic system.

One design of the invention consists in the membrane being integrated into a tubular line segment of the hydraulic system.

Provision is also made according to the invention for the membrane to be cylindrical in shape.

It is advantageous for the membrane to be a solvent/diffusion membrane.

The framework of the invention likewise includes a membrane consisting of polypropylene (PP), polyethylene (PE), polyvinyltrimethylsiloxane (PVTMS), polytetrafluoroethylene (PTFE), polybutadiene (PB), polydimethylsiloxane (PDMS), or polychloroprene (PCP).

Finally, the use of the device for degassing and/or dewatering hydraulic fluid in control, regulating, drive, and brake hydraulic systems of motor vehicles, vessels, and aircraft is covered by the invention.

The advantages of the invention consist essentially in the fact that a reliable and cost-favorable, non-space-intensive possibility is created for degassing and/or dewatering hydraulic fluids which can be used for example when, for space reasons, the hydraulic lines cannot be laid so that they continuously rise but an arc must be taken into account at which the gas and/or steam bubbles can collect, which can result in a total failure of the hydraulic system, something which absolutely must be avoided.

An embodiment of the invention is described below with reference to the drawings.

DETAILED DESCRIPTION OF THE DRAWINGS

Figure 1:
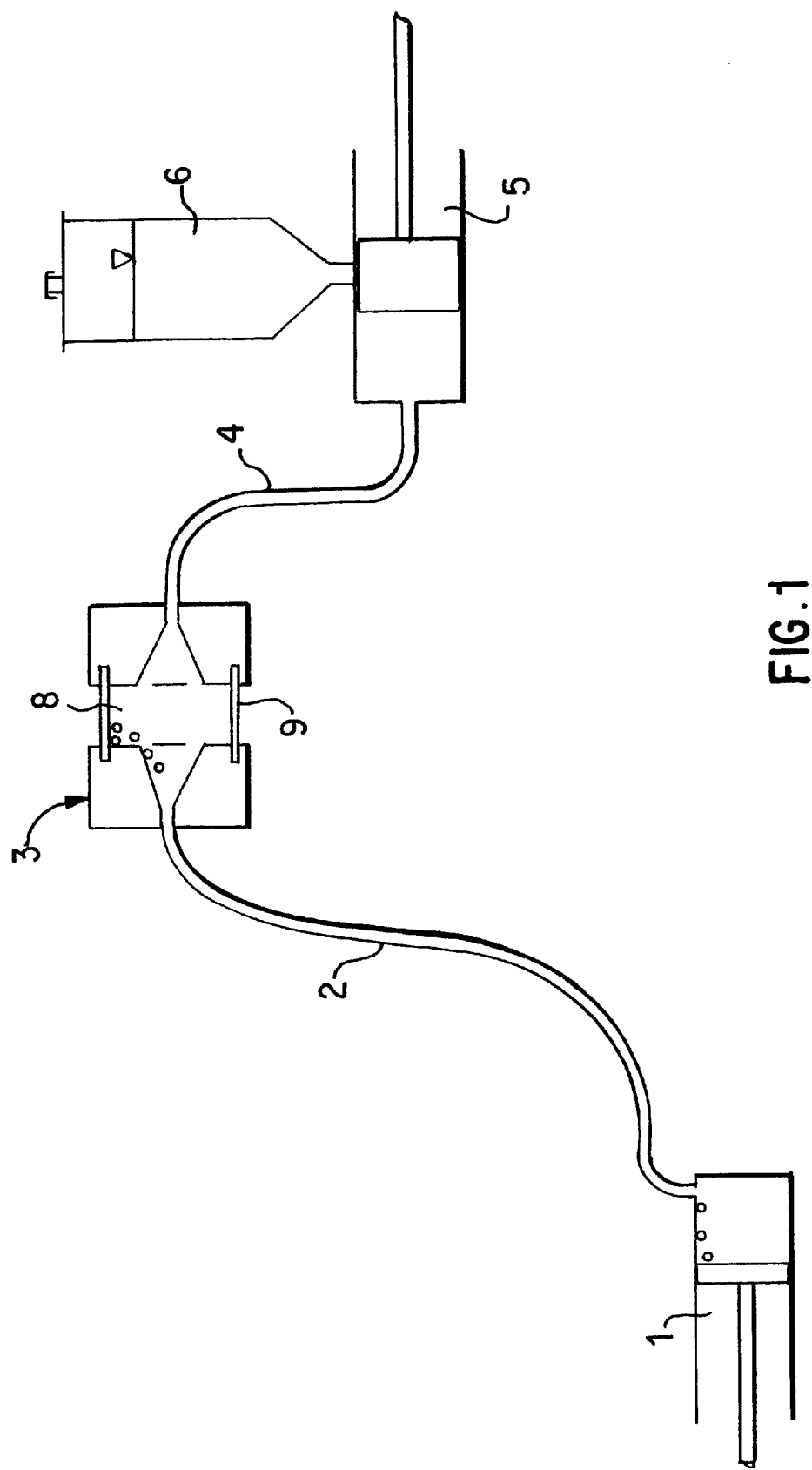
FIG. 1 shows a simple system for hydrostatic force transmission.

FIG. 1 shows a simple example of a hydrostatic force transmission in which it is assumed that harmful air penetrates the hydraulic system through a slave cylinder 1 and air collects at the highest point 3 in line 2. At this point, according to the invention, there is a membrane 9, preferably a solvent/diffusion membrane 9 through which the necessary degassing can occur. The design shown is especially advantageous since area 8 around membrane 9 and the membrane itself are made cylindrical so that disturbing air collects at membrane 9 largely as a function of position and can penetrate this membrane. Line segment 4 to a master cylinder 5, connected with equalizing tank 6, is also shown.

Solvent/diffusion membranes are characterized by having no pores and are suitable for use at higher pressures (and in part also at high temperatures) like those that can occur in hydraulic fluids. The transport mechanism of such a membrane is based on the fact that dissolved or free gases as well as any water are dissolved on the hydraulic fluid side of the membrane and are released again on the other side of the membrane, with the material being transported through the membrane by diffusion as a result of a concentration differential. Of course, free air can also be removed through the membrane.

The permeability of the membrane materials in question to water is higher as a rule than for the corresponding gases (nitrogen, oxygen, etc.), so that simultaneous dewatering of hydraulic fluids which are as a rule hygroscopic suggests itself. A higher temperature of the hydraulic fluid (60 to 100 degrees C.) is advantageous for dewatering and either exists in the hydraulic system or is developed there.

If the permeate side is open to the environment, the hydraulic fluid can be degassed or dewatered only if there is a pressure increase in the hydraulic system. If this is the case only briefly (in brake systems, for example) the degassing or dewatering time can be too short unless the required partial pressure differential is provided by a vacuum outside the hydraulic system (as in aircraft for example). In such cases, and when continuous removal of air or dewatering are necessary, a vacuum system can also be provided on the permeate side which permanently maintains a partial pressure differential.

Figure 2:
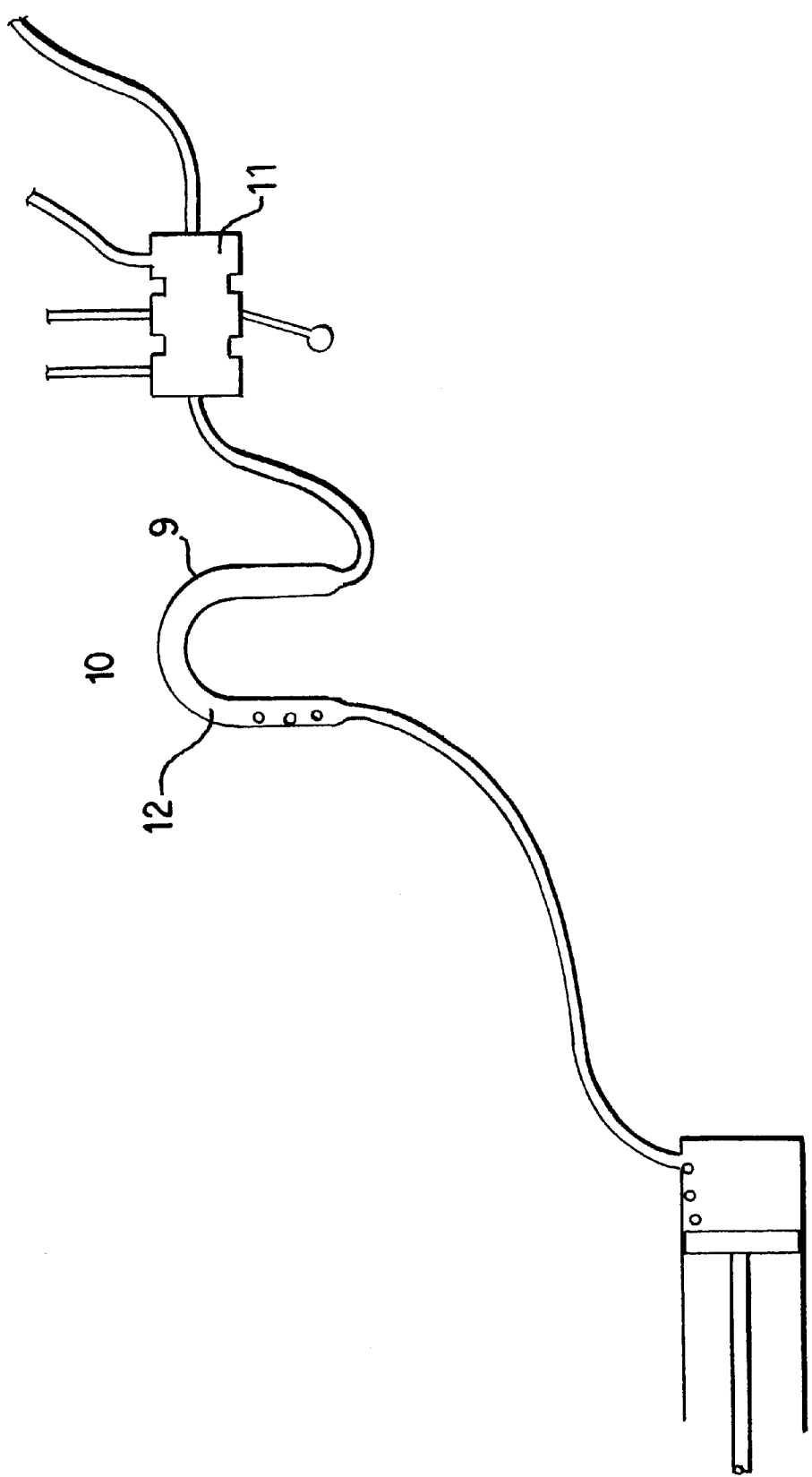
FIG. 2 shows another design of a hydraulic force transmission.

FIG. 2 shows another advantageous design of the invention in which a tubular air removal module 12 on line side 10 protects a device 11 downstream which can be a pump or slave cylinder for example.

Figure 3:
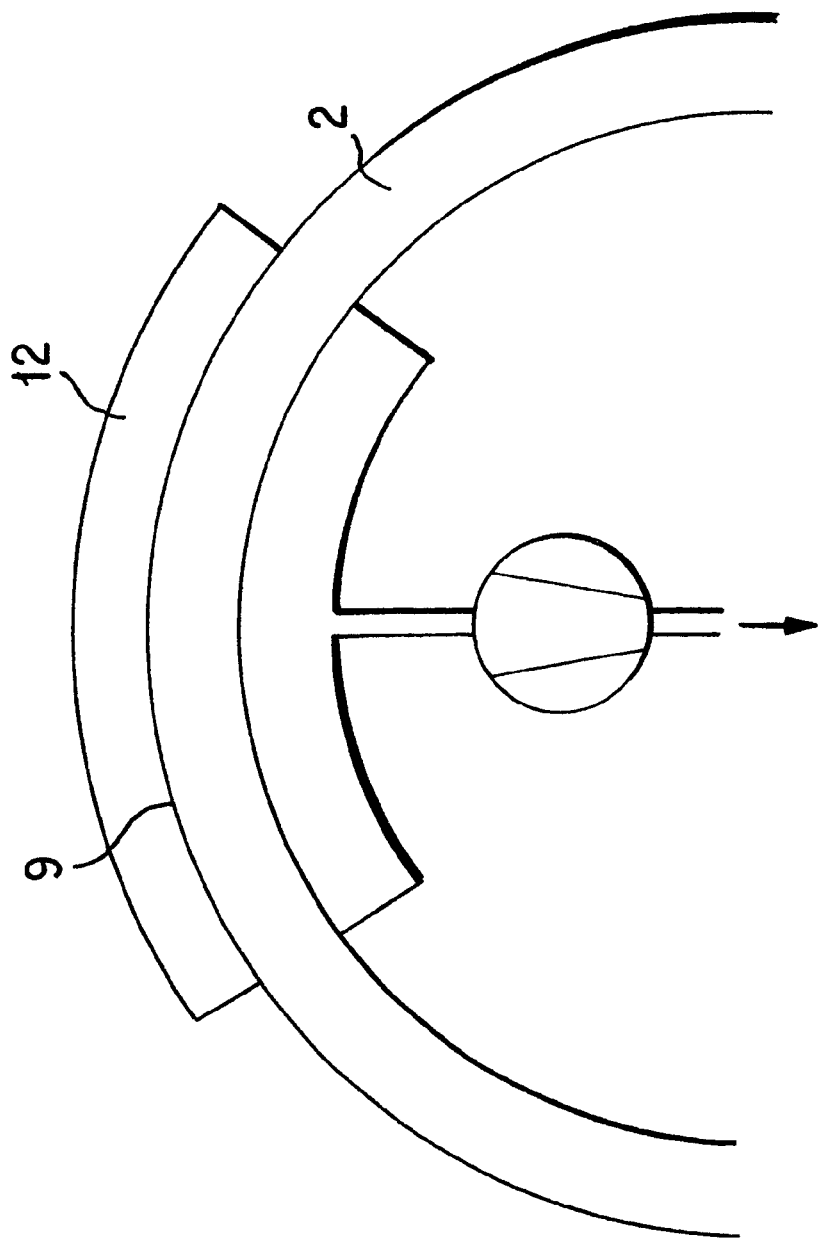
FIG. 3 shows a design for removing permeate.

FIG. 3 shows a design with removal of the permeate by connection to a vacuum system. This version is especially advantageous when water is to be removed simultaneously or when a vacuum is present in any case (aviation, motor vehicle with vacuum pump, etc.).

As membrane materials, for example, polypropylene (PP), polyethylene (PE), polyvinyltrimethylsiloxane (PVTMS), polytetrafluoroethylene (PTFE), polybutadiene (PB), polydimethylsiloxane (PDMS) or polychloroprene (PCP) can be used, with degassing rates of 2.5 ml per minute having been achieved for example on a membrane surface 20 cm square for example in tests using DOT 4 brake fluid.

What is claimed is:

1. A method for degassing and dewatering a hydraulic fluid within a hydraulic system, comprising:

separating water contained in the hydraulic fluid and gas dissolved in the hydraulic fluid by pervaporation at a membrane that is permeable to the water and the gas and impermeable to the hydraulic fluid, wherein said membrane is integrated into a tubular line segment of the hydraulic system;

developing a partial pressure differential inside the hydraulic system; and developing a vacuum outside the hydraulic system, thereby maintaining said partial pressure differential inside the hydraulic system.

2. A method according to claim 1, further comprising increasing a temperature of the hydraulic fluid.

3. A device for degassing and dewatering a hydraulic fluid within a hydraulic system, comprising a membrane within the hydraulic system that is permeable to gas and water and that is impermeable to the hydraulic fluid.

4. A device according to claim 3, further comprising a vacuum device on the outside of the membrane that faces away from the hydraulic system.

5. A device according to claim 3, wherein the membrane has a cylindrical shape.

6. A device according to claim 3, wherein the membrane is a solvent/diffusion membrane.

7. A device according to claim 3, wherein the membrane is selected from the group consisting of polypropylene, polyethylene, polyvinyltrimethylsiloxane, polytetrafluoroethylene, polybutadiene, polydimethylsiloxane and polychloroprene.

8. A control regulating drive comprising a device according to claim 3.

9. A brake hydraulic system comprising a device according to claim 3.

10. A vehicle comprising a brake hydraulic system according to claim 9.

11. A vehicle according to claim 10, wherein said vehicle is selected from the group consisting of motor vehicles, vessels, and aircraft.

* * * * *